United States Patent
McNamara et al.

(10) Patent No.: US 10,131,847 B2
(45) Date of Patent: Nov. 20, 2018

(54) CONVERSION OF WASTE PLASTICS MATERIAL TO FUEL

(75) Inventors: David McNamara, County Laois (IE); Michael Murray, County Dublin (IE)

(73) Assignee: Plastic Energy Limited, London (GB)

( * ) Notice: Subject to any disclaimer, the term of this patent is extended or adjusted under 35 U.S.C. 154(b) by 813 days.

(21) Appl. No.: 13/517,323

(22) PCT Filed: Dec. 20, 2010

(86) PCT No.: PCT/IE2010/000077
§ 371 (c)(1),
(2), (4) Date: Jun. 20, 2012

(87) PCT Pub. No.: WO2011/077419
PCT Pub. Date: Jun. 30, 2011

(65) Prior Publication Data
US 2012/0261247 A1   Oct. 18, 2012

(30) Foreign Application Priority Data

Dec. 22, 2009 (IE) ..................................... 2009/0971

(51) Int. Cl.
*C10B 47/28* (2006.01)
*C10B 47/32* (2006.01)
(Continued)

(52) U.S. Cl.
CPC ................ *C10G 1/10* (2013.01); *C10B 47/18* (2013.01); *C10B 53/07* (2013.01); *F23G 5/02* (2013.01);
(Continued)

(58) Field of Classification Search
CPC ........ B01D 5/0063; B01D 5/006; B01D 3/24; C10B 53/07; B29B 2017/0496
(Continued)

(56) References Cited

U.S. PATENT DOCUMENTS

| | | | | |
|---|---|---|---|---|
| 2,005,316 A | * | 6/1935 | Hall | B01D 3/24 196/128 |
| 2,323,128 A | * | 6/1943 | Hare | 208/347 |
| 3,616,267 A | * | 10/1971 | McNeill et al. | 203/3 |
| 3,627,744 A | * | 12/1971 | Hopkins et al. | 526/68 |

(Continued)

FOREIGN PATENT DOCUMENTS

| | | |
|---|---|---|
| GB | 2158089 | 11/1985 |
| WO | 01/05908 | 1/2001 |

(Continued)

OTHER PUBLICATIONS

Totten, George E. Westbrook, Steven R. Shah, Rajesh J.. (2003). Fuels and Lubricants Handbook—Technology, Properties, Performance, and Testing: (MNL 37WCD)—5. Automotive Diesel and Non-Aviation Gas Turbine Fuels. (pp. 115,116,117). ASTM International.*

*Primary Examiner* — Jonathan Miller
*Assistant Examiner* — Jonathan Luke Pilcher
(74) *Attorney, Agent, or Firm* — Studebaker & Brackett PC

(57) ABSTRACT

A process is described for treating waste plastics material to provide at least one on-specification fuel product. Plastics material is melted and then pyrolyzed in an oxygen-free atmosphere to provide pyrolysis gases. The pyrolysis gases are brought into contact with plates in a contactor vessel so that some long chain gas components condense and return to be further pyrolyzed to achieve thermal degradation. Short chain gas components exit the contactor in gaseous form and proceed to distillation to provide one or more on-specification fuel products. A pipe directly links the pyrolysis chamber to the contactor, suitable for conveying upwardly-moving pyrolysis gases and downwardly-flowing long-chain liquid for thermal degradation.

26 Claims, 2 Drawing Sheets

Figure 1:
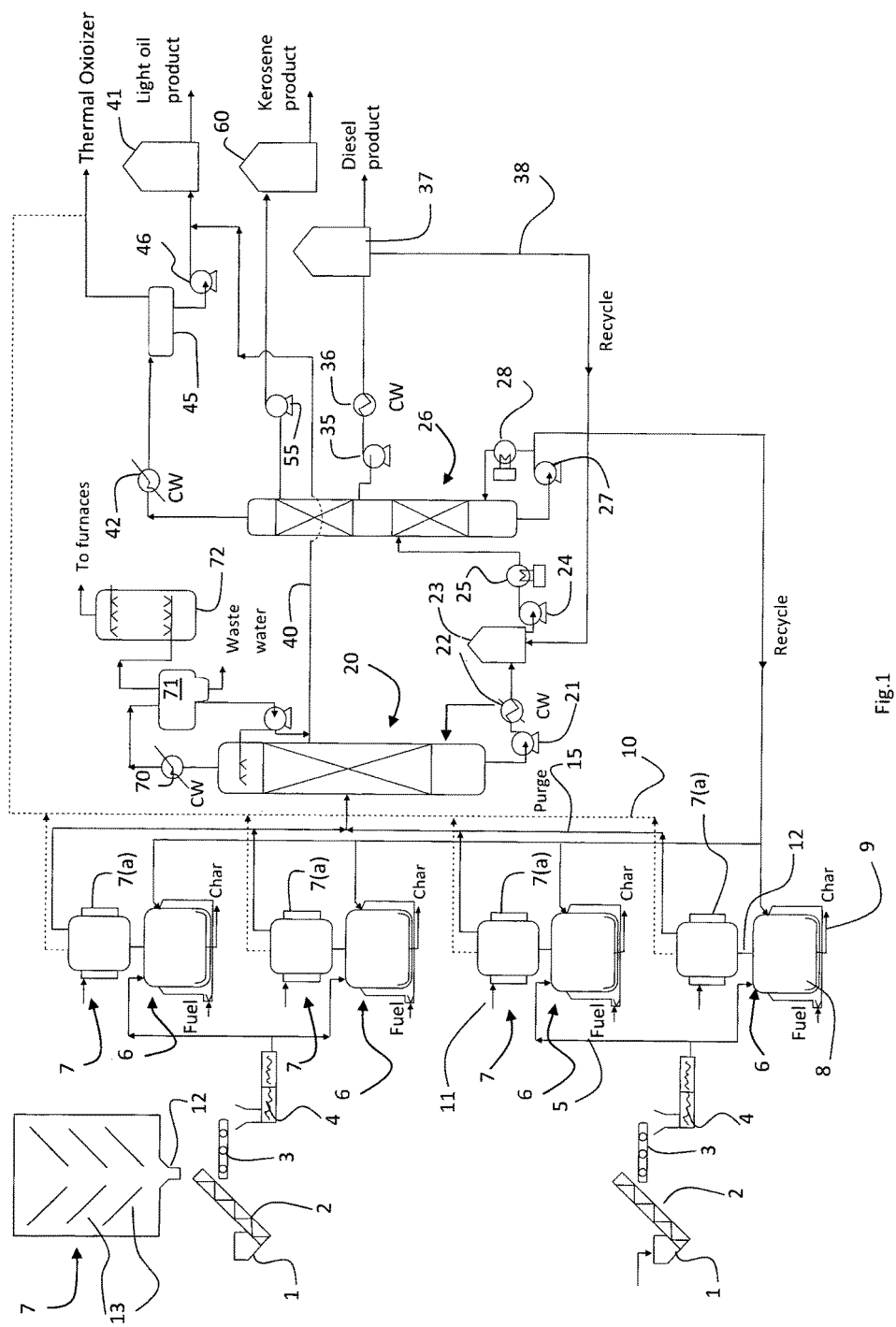

(51) Int. Cl.

| | | |
|---|---|---|
| *C10B 53/07* | (2006.01) | |
| *C10G 1/00* | (2006.01) | |
| *C10G 1/02* | (2006.01) | |
| *B01D 3/14* | (2006.01) | |
| *B01D 3/24* | (2006.01) | |
| *B01D 5/00* | (2006.01) | |
| *C10G 1/10* | (2006.01) | |
| *C10B 47/18* | (2006.01) | |
| *F23G 5/02* | (2006.01) | |
| *F23G 7/12* | (2006.01) | |
| *C10B 47/34* | (2006.01) | |

(52) U.S. Cl.
CPC ................ *F23G 7/12* (2013.01); *B01D 3/14* (2013.01); *B01D 3/143* (2013.01); *B01D 3/24* (2013.01); *B01D 5/006* (2013.01); *B01D 5/0057* (2013.01); *B01D 5/0063* (2013.01); *C10B 47/28* (2013.01); *C10B 47/32* (2013.01); *C10B 47/34* (2013.01); *C10G 1/00* (2013.01); *C10G 1/02* (2013.01); *C10G 2300/1003* (2013.01); *C10G 2300/4081* (2013.01); *C10G 2400/04* (2013.01); *F23G 2201/301* (2013.01); *F23G 2201/80* (2013.01); *F23G 2900/50205* (2013.01); *F23G 2900/50212* (2013.01); *Y02P 20/143* (2015.11)

(58) Field of Classification Search
USPC .......................................................... 202/84
See application file for complete search history.

(56) References Cited

U.S. PATENT DOCUMENTS

| | | | | |
|---|---|---|---|---|
| 3,864,214 | A * | 2/1975 | Ohakas | B01D 3/00 |
| | | | | 202/173 |
| 4,218,353 | A * | 8/1980 | Kim | 524/490 |
| 4,284,616 | A * | 8/1981 | Solbakken | B29B 17/02 |
| | | | | 201/2.5 |
| 4,652,451 | A * | 3/1987 | Leedham et al. | 426/11 |
| 5,731,483 | A | 3/1998 | Stabel | |
| 5,738,025 | A | 4/1998 | Tachibana | |
| 5,824,193 | A * | 10/1998 | Edwards | C10B 47/34 |
| | | | | 201/7 |
| 5,849,964 | A | 12/1998 | Holighaus | |
| 6,011,187 | A * | 1/2000 | Horizoe et al. | 585/241 |
| 8,187,428 | B2 * | 5/2012 | Shimo | C08J 11/12 |
| | | | | 201/2.5 |
| 2003/0050519 | A1 * | 3/2003 | Cheng | 585/241 |
| 2003/0199718 | A1 | 10/2003 | Miller | |
| 2003/0204106 | A1 * | 10/2003 | Shibusawa et al. | 560/205 |
| 2006/0006098 | A1 * | 1/2006 | Espinoza et al. | 208/15 |
| 2006/0076224 | A1 * | 4/2006 | Ku | 202/99 |
| 2006/0112709 | A1 | 6/2006 | Boyle | 62/272 |
| 2006/0163053 | A1 * | 7/2006 | Ershag | 201/13 |
| 2008/0264771 | A1 * | 10/2008 | Dam-Johansen et al. | 201/4 |
| 2009/0117015 | A1 * | 5/2009 | Shimo | C08J 11/12 |
| | | | | 422/184.1 |
| 2009/0321317 | A1 | 12/2009 | Widmer | |

FOREIGN PATENT DOCUMENTS

| | | |
|---|---|---|
| WO | 2005/087897 | 9/2005 |
| WO | 2008/022790 | 2/2008 |

* cited by examiner

CONVERSION OF WASTE PLASTICS MATERIAL TO FUEL

This is a national stage of PCT/IE10/00077 filed Dec. 20, 2010 and published in English, which claims the priority of Irish number 2009/0971 filed Dec. 22, 2009, hereby incorporated by reference.

FIELD OF THE INVENTION

The invention relates to conversion of waste hydrocarbon material such as plastics into fuel.

PRIOR ART DISCUSSION

GB2158089 (Suzy-Jen) describes a treatment process in which plastics is melted and heated to produce gas, the gas is condensed to provide an oily liquid, and this is fractionally distilled. WO2005/087897 (Ozmotech Pty) describes a process in which there may be multiple pyrolysis chambers. Pyrolysis gases are transferred into a catalytic converter where the molecular structure of the gaseous material is altered in structure and form WO01/05908 (Xing) describes a process in which there are first and second cracking stages with first and second catalysts. US2003/0199718 (Miller) describes an approach in which there is pyrolysis and the reactor is maintained at a temperature in the range of 450° C. and 700° C. The effluent from the pyrolysis reactor is passed to a catalytic summarization de-waxing unit.

The invention is directed towards providing a process which more consistently produces particular grades of "on-spec" fuel, and/or with an improved yield.

SUMMARY OF THE INVENTION

According to the invention, there is provided a process for treating waste plastics material to provide at least one fuel product, the process comprising the steps of:
melting the waste plastics material,
pyrolysing the molten material in an oxygen-free atmosphere to provide pyrolysis gases;
bringing the pyrolysis gases into a contactor having a bank of condenser elements so that some long chain gas components condense on said elements,
returning said condensed long-chain material to be further pyrolysed to achieve thermal degradation, and allowing short chain gas components to exit from the contactor in gaseous form; and
distilling said pyrolysis gases from the contactor in a distillation column to provide one or more fuel products.

In one embodiment, the contactor elements comprise a plurality of plates forming an arduous path for the pyrolysis gases in the contactor. Preferably, the plates are sloped downwardly for run-off of the condensed long-chain hydrocarbon, and include apertures to allow upward progression of pyrolysis gases. In one embodiment, the contactor elements comprise arrays of plates on both sides of a gas path. In one embodiment, the contactor element plates are of stainless steel.

In one embodiment, the contactor is actively cooled by a cooling means. In one embodiment, the cooling is by a heat exchanger for at least one contactor element.

In one embodiment, there is a pipe directly linking the pyrolysis chamber to the contactor, the pipe being arranged for conveying upwardly-moving pyrolysis gases and downwardly-flowing long-chain liquid for thermal degradation.

In one embodiment, the cooling means comprises a contactor jacket and cooling fluid is directed into the jacket.

In one embodiment, the cooling means controls a valve linking the jacket with a flue, opening of the valve causing cooling by down-draught and closing of the valve causing heating.

In one embodiment, the valve provides access to a flue for exhaust gases of a combustion unit of the pyrolysis chamber.

In one embodiment, infeed to the pyrolysis chamber is controlled according to monitoring of level of molten plastics in the chamber, as detected by a gamma radiation detector arranged to emit gamma radiation through the chamber and detect the radiation on an opposed side, intensity of received radiation indicating the density of contents of the chamber.

In one embodiment, the pyrolysis chamber is agitated by rotation of at least two helical blades arranged to rotate close to an internal surface of the pyrolysis chamber. Preferably, the pyrolysis chamber is further agitated by a central auger. In one embodiment, the auger is located so that reverse operation of it causes output of char via a char outlet.

In one embodiment, the temperature of pyrolysis gases at an outlet of the contactor is maintained in the range of 240° C. to 280° C. Preferably, the contactor outlet temperature is maintained by a heat exchanger at a contactor outlet.

In one embodiment, a bottom section of the distillation column is maintained at a temperature in the range of 200° C. to 240° C., preferably 210° C. to 230° C. Preferably, the top of the distillation column is maintained at a temperature in the range of 90° C. to 110° C., preferably approximately 100° C.

In one embodiment, diesel is drawn from the distillation column and is further distilled to provide on-specification fuels.

In one embodiment, material is drawn from the top of the distillation column to a knock-out pot which separates water, oil, and non-condensable gases, in turn feeding a gas scrubber to prepare synthetic gases for use in furnaces.

In one embodiment, there is further distillation of some material is in a vacuum distillation column. Preferably, heavy or waxy oil fractions are drawn from the bottom of the vacuum distillation column. In one embodiment, said heavy or waxy oil is recycled back to the pyrolysis chamber. In one embodiment, desired grade on-specification diesel is drawn from a middle section of the vacuum distillation column. In one embodiment, light fractions are drawn from a top section of the vacuum distillation column and are condensed.

In one embodiment, the pyrolysis chamber and the contactor are purged in isolation from downstream components of the system. In one embodiment, a purging gas such as nitrogen is pumped through the pyrolysis chamber and the contactor and directly from the contactor to a thermal oxidizer where purging gas is burned. Preferably, any pyrolysis gases remaining at the end of a batch process are delivered from the contactor and are burned off together with the purging gas.

In one embodiment, load on a pyrolysis chamber agitator is monitored to provide an indication of when char drying is taking place.

In another aspect, the invention provides an apparatus for treating waste plastics material to provide at least one fuel product, the apparatus comprising:
means for melting the waste plastics material,
a pyrolysis chamber for pyrolysing the molten material in an oxygen-free atmosphere to provide pyrolysis gases;

a conduit for bringing the pyrolysis gases into a contactor having a bank of condenser elements so that some long chain gas components condense on said elements, a conduit for returning said condensed long-chain material to be further pyrolysed to achieve thermal degradation, a conduit for allowing short chain gas components to exit from the contactor in gaseous form; and a distillation column for distilling said pyrolysis gases from the contactor to provide one or more fuel products.

In one embodiment, the contactor elements comprise a plurality of plates forming an arduous path for the pyrolysis gases in the contactor.

In one embodiment, the plates are sloped downwardly for run-off of the condensed long-chain hydrocarbon, and include apertures to allow upward progression of pyrolysis gases.

In one embodiment, there is a pipe directly linking the pyrolysis chamber to the contactor, the pipe being arranged for conveying upwardly-moving pyrolysis gases and downwardly-flowing long-chain liquid for thermal degradation.

In one embodiment, the apparatus comprises a cooling means adapted to control a valve linking the jacket with a flue, opening of the valve causing cooling by down-draught and closing of the valve causing heating.

In one embodiment, the valve provides access to a flue for exhaust gases of a combustion unit of the pyrolysis chamber.

In one embodiment, the apparatus further comprises a purging means adapted to purge the pyrolysis chamber and the contactor in isolation from downstream components of the system, and to pump a purging gas through the pyrolysis chamber and the contactor and directly from the contactor to a thermal oxidizer where purging gas is burned.

DETAILED DESCRIPTION OF THE INVENTION

Figure 2:
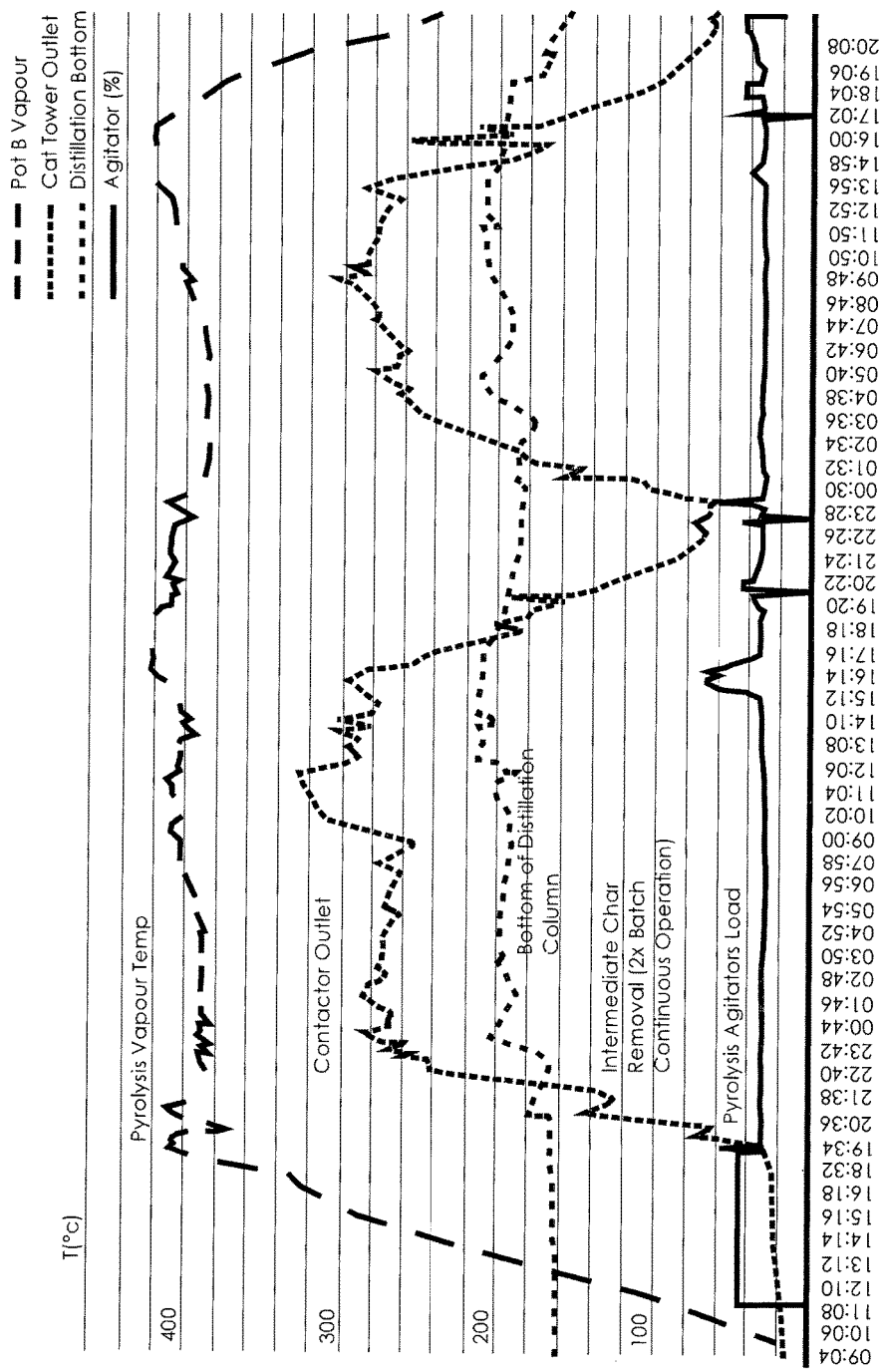

The invention will be more clearly understood from the following description of some embodiments thereof, given by way of example only with reference to the accompanying drawings in which:

FIG. 1 is a diagram showing a system of the invention for treatment of waste plastics; and FIG. 2 is a set of plots showing various key parameters monitored during operation of the system.

SYSTEM

Referring to FIG. 1, a system for treatment of waste plastics comprises the following main components:

1, two waste plastics infeed hoppers, each receiving pelletized or flaked plastics material including all polythene variants, polystyrene, and polyproplene;
2, plastics infeed conveyor;
3, weigh belt;
4, extruder having four heating stages to melt the plastics material to a final temperature of about 300° C.,
5, feed lines from the extruder 4 to two pyrolysis chambers 6;
6, pyrolysis chambers or reactors, of which there are four, each for oxygen-free pyrolysis of the hydrocarbons and delivering pyrolysis gases to a contactor 7, and each chamber 6 has a combustion unit 8 and a char outlet 9;
7, contactor having a cooling jacket 7(a),
10, purge lines for the pyrolysis chambers 6 and the contactors 7,
11, flue valves for the contactors 7, linking an exhaust flue to a jacket around the contactor vessel;
12, pipe linking each pyrolysis chamber 6 with its associated contactor 7, to allow hydrocarbon vapour (pyrolysis gases) to flow up and condensed heavy long-chain hydrocarbon material to flow back into the pyrolysis chamber 6 for thermal degradation treatment;
13, stainless steel plates of the contactor, arranged with holes so pyrolysis gases can pass upwardly, and being sloped so that condensed long-chain hydrocarbon material runs down and back to the relevant pyrolysis chamber 6 via the pipe 12;
15, pyrolysis gas outlet manifold for routing to distillation;
20, first (atmospheric) distillation column;
21, pump for diesel output of bottom of the first distillation column 20, feeding a cooler 22, in turn feeding a diesel holding tank 23 and a re-circulation link back to the distillation column 20;
24, pump for pumping diesel fuel from the tank 23 to a heater 25, which feeds a vacuum distillation column 26;
27, pump for pumping waxy residues to a heater 28 for re-circulation, or as a recycled feedback to the pyrolysis chambers 6 according to control by valves, not shown;
35, pump for pumping diesel via a cooler 36 from the vacuum distillation column 26 to a diesel holding tank 37;
38, feedback link from the diesel product tank 37 to the holding tank 23, for use if the final product diesel is determined after testing to not be at the required standard;
40, outlet from the top of the first distillation column 20 to a light oil product tank 41;
42, cooler for feed from the top of the vacuum distillation column 26 to a light oil tank 45;
45, light oil tank having a link to a thermal oxidizer;
46, pump for delivering light oil from the tank 45 to the light oil product tank 41;
55, pump for pumping kerosene from the vacuum distillation column 26 to a kerosene product tank 60;
70, cooler arranged to draw from the top of the first distillation column 20 to a knock-out pot 71 which separates water, oil, and non-condensable gases, in turn feeding a gas scrubber 72 to prepare synthetic gases for use in furnaces.

Process

Waste plastics material is processed to granular or flake form. It is heated in the extruder 4 and molten plastics is fed into the pyrolysis chambers 6. This is done while ensuring that no oxygen enters the system and molten plastics is maintained as close as possible to a pyrolysis temperature, preferably 300° C. to 320° C.

In each pyrolysis chamber 6 the plastics material is heated to 390° C. to 410° C. in a nitrogen-purged system while agitating. Agitation is performed by a double helical agitator with a central screw, and the helical blades sweep at a separation of about 5 mm from the chamber internal surface. This maximizes heat transfer at walls of the vessel 6, which is very advantageous due to the poor heat transfer properties of the infeed plastics material.

Pyrolysis gases rise through the direct pipe link 12 to the contactor 7. In the contactor 7 there is contact between the vapour and the metal plates 13 in a staggered baffle-like arrangement. This causes some condensation of the vapour long C chains. The proportion of gases which are condensed in this manner is approximately 15% to 20%. The level of condensation can be controlled by control of the temperature of the jacket 7(a), which is cooled by chilled water and also by control of flue down-draught.

The condensed liquid runs back through the same pipe 12 to the pyrolysis chamber 10 to be thermally degraded. The bottom of the contactor 6, as shown in the expanded view of FIG. 1, is funnel-shaped to accommodate this flow. This process is referred to in this specification as thermal degradation. It avoids need for catalytic cracking as is performed in the prior art. The thermal degradation of the invention is achieved in a very simple manner, by simply allowing the pyrolysis gases to rise through the pipe 12 into the contactor 7 and for the longer/heavier chains to condense on the baffle plates 13 and from there to run back for further pyrolysis. It is our understanding that this mechanism avoids need for catalytic cracking because the contactors 7 ensure that the heavy/long carbon chains do not pass through the system but are broken down further in the contactors or fall back into the pyrolysis vessel for further degradation. Without them, very heavy material (half way between plastic and liquid fuel) will pass through the system, giving a large proportion of syngas. The baffle plates 13 provide an arduous path with a long residence time, and their apertures allow passage of the upwardly-flowing pyrolysis gases.

It is envisaged that the plates may incorporate active cooling by being part of a heat exchanger. Such cooling could be controlled to fine-tune the grade of end-product diesel obtained.

Importantly, the thermal degradation avoids need for catalysts, which would be expensive, require replacement, and may be consumed in the process. The prior art catalyst waste material is often hazardous, resulting in expensive disposal Also, the prior processes involving catalysts are much more complicated and have tighter operating conditions.

An advantageous aspect of the contactor operation is that the valves 11 are used to cool down the contactors by allowing down-draught from the flue into the surrounding jacket. This is in contrast to the prior catalytic cracking approach, in which efforts are made to heat the catalysts as much as possible. We have found that by providing the valves 11 with access to the flue we have a very simple and effective mechanism for cooling the contactor. The temperature control of the contactors 7 is achieved by opening and closing the flue valves 11, opening a contactor tower flue valve 11 cools the contactor due to the chimney down-draught effect. Also, cooling of the contactors takes place by controlling water flow through water pipes running through the contactor jackets 7(a).

The vapour at 250° C. to 300° C. and most preferably at 260° C. to 280° C. is fed into the first distillation column 20. The sump at the bottom of the column 20 has re-circulation through the pump 21 and the cooler 22 and the temperature is maintained as close as possible to 220° C. in this part of the column 20.

By appropriate operation of valves, diesel is drawn from the sump of the column 20 into the tank 23 and from there to the vacuum distillation column 26. On-spec diesel is provided from the vacuum distillation column 26 to the product tank 37.

The vacuum distillation column 26 allows operation at much lower temperatures and is smaller, while achieving equivalent results to an atmospheric distillation column.

The top part of the first distillation column 20 is maintained as close as possible to 100° C. Light oil is drawn directly to the tank 41. This is a by-product, but may be used to power a low-compression engine to power the plant or to generate electrical power for the grid.

There is also a feed of light oil to the tank 41 from the top of the vacuum distillation column 26 via the tank 45 and the pump 46. It has been found that the first distillation column 20 has about 20% light oil output and the vacuum column 26 has about 10% light oil output.

The gas scrubber 72 washes and prepares the synthetic gases for use in the furnaces for the pyrolysis chamber (process is parasitic), and waste water is delivered for treatment.

Diesel is drawn from the bottom section of the first distillation column 20 to the holding tank 23 from which it is fed via the heater 25 to the vacuum tower 26. Heavy oil is drawn from the bottom section of the vacuum tower 26 and is used as a supply for the pyrolysis chambers, suitably heated by the wax heater 28. The main product, diesel, is drawn from the middle section of the vacuum column 26 via the cooler 36 to the product tank 37.

Regarding the components 70, 71, and 72 linked with the top of the first distillation column 20, synthetic gases are taken off the top of the column 20. The cooler 70 draws from the top of the column 20 to the knock-out pot 71, which separates water, oil, and non-condensable gases, in turn feeding a gas scrubber 72 to prepare synthetic gases for use in furnaces. There is feedback from the knock-out pot 71 to the top of the column 20. Levels are automatically controlled.

As a batch ends, increased load on the pyrolysis chamber agitator indicates that char drying is taking place, and that the process is ending. Rather than purge the full system with $N_2$, risking the $N_2$ carrying char through the full system, $N_2$ is purged via the conduits 10 through the contactors 7 and the pyrolysis chambers 6 only. Resulting vapour is drawn off from above the contactors 7 and is burned off in a thermal oxidizer. This allows the system to continue without being distorted and isolates mechanical removal of the char. The pyrolysis chambers 6 are purged with nitrogen which passes up through the contactor 6 and out the top directly to thermal oxidisers to flush any remaining hydrocarbons. This ensures a safe char removal sequence. During this phase the pyrolysis vessel 6 and contactor 7 have been isolated from the rest of the system. This reduces process time and prevents char from being carried through the system and fouling components such as the fuel lines and pumps. It has been found that this provides improved stability in the process by avoiding risk of contamination of downstream components with char particles. It also reduces the purging time.

The double helical agitator blades are operated in reverse to remove char during purging. This char removal process can be performed continuously, if desired.

The char leaves the pot by opening a large valve at the base of the pyrolysis vessel 6. Under the pyrolysis vessel is a negatively charged pot which initially draws the char into it. The agitator is designed at the base such that when it operates in the reverse direction to that during processing it sweeps the char into the centre of the vessel and the agitator screw pushes the char down into a char pot. Once cooled, the char is vacuumed into a char vessel for removal from site.

The pyrolysis chamber jacket is heated to c. 590° C. so that there is further drying of the char for about 4 hours.

Although not illustrated, each pyrolysis chamber 6 has a detector for determining content of the chamber for control purposes. The detector comprises a gamma radiation source on one side and a receiver along the opposed side. The intensity of radiation detection on the receiving side provides an indication of level in the chamber 6. A major advantage is that the emitter and the receiver are mounted on the outside of the chamber 6, and so are totally non-invasive. The emitted gamma radiation is attenuated as it passes through the chamber 6, the intensity detected at the receiver being an indication of the density of contents of the chamber 6.

Referring to FIG. 2 various parameters for the system are monitored for effective system control. It shows that as the agitator load increases (in this example at about 14.30 hours) when char drying is taking place. It also shows that the bottom of the first distillation column 20 stays approximately constant, even between batches, due to operation of a heater.

It will also be appreciated that the contactor 7 outlet temperature can rise above optimum towards the end of the batch.

It has been found that the process as described above provides a high quality diesel product in the tank 37, meeting the EN590 European standards. The other major on-spec fuel is BS2869 for kerosene.

The invention is not limited to the embodiments described but may be varied in construction and detail. For example, there may be a cooler at the contactor 7 outlet to maintain a vapour outlet temperature in the desired range. Also, there may be additional active cooling of the contactors 7, such as by chilled water circulation in a jacket around the contactor plates, or indeed by an arrangement in which the contactor has an active heat exchanger in direct contact with the pyrolysis gases. Such a heat exchanger may replace some or all of the baffle plates described above. This cooler may for example work with oil which is passed through the cooler at the target temperature. Chilled water may be used to control the oil temperature. The cooling system may also include a liquid knockout pot for return of heavier chains to the pyrolysis chambers 6 for further cracking. It has been found that maintenance of the vapour temperature at this level at the outlet of the contactor 7 is particularly advantageous for achieving the desired grade of fuel products.

The invention claimed is:

1. A process for treating waste plastics material to provide at least one fuel product, the process being implemented by an apparatus comprising:
    an extruder configured to melt the waste plastics material into a molten material,
    a pyrolysis chamber configured to be isolated during purging via a purging conduit,
    a contactor configured to be isolated during the purging via the purging conduit, the contactor comprising a bank of condenser elements inside the contactor comprising plates sloped downwardly and having apertures and forming an arduous path within the contactor, and a heat exchanger including a cooling jacket surrounding at least a portion of said condenser elements, wherein the portion of said condenser elements are surrounded by the cooling jacket in a first direction when viewing the contactor and the cooling jacket in a side cross-sectional view thereof, and wherein the cooling jacket is provided outside an exterior surface of the contactor including the bank of condenser elements and the plates, and
    a pipe directly linking the pyrolysis chamber to the contactor in a second direction, the second direction perpendicular to the first direction,
    and the method comprising the steps of:
    melting, in said extruder, the waste plastics material including a mixture of pelletized, flaked or granularized waste plastics material including a mixture of different waste plastics material, the mixture including at least two waste plastics from the group consisting of polythene, polythene variants, polystyrene and polypropylene, the mixture being a dynamically variable mixture of polythene, polythene variants, polystyrene and polypropylene, to produce the molten material,
    pyrolysing the molten material received from the extruder in said pyrolysis chamber in an oxygen-free atmosphere with agitation to provide pyrolysis gases;
    conveying upwardly the pyrolysis gases from the pyrolysis chamber via said pipe into said contactor, said flow not including any other pyrolysis gases, the gases flowing up said arduous path within the contactor, in which:
    said pyrolysis gases directly contact the condenser elements in the contactor, so that some long chain gas components of said pyrolysis gases condense on said condenser elements and return directly via said pipe to said pyrolysis chamber for thermal degradation, said pipe being the only direct inlet into a vessel inside the contactor from the pyrolysis chamber, and
    cooling fluid is directed into the heat exchanger cooling jacket surrounding said condenser elements so that level of condensation on the condenser elements is controlled by control of temperature within the contactor, wherein the temperature of pyrolysis gases at an outlet of the contactor is maintained in the range of 240° C. to 280° C., and directly flowing said exit pyrolysis gases into a distillation column separated from said contactor, and distilling said pyrolysis gases in said distillation column to provide one or more fuel products,
    wherein the pyrolysis chamber and the contactor are purged in isolation from downstream components of the system after pyrolysis, and
    wherein, during the purging via the purging conduit, the pyrolysis chamber and the contactor are configured to be isolated from the extruder and any other of the downstream components of the system.

2. The process as claimed in claim 1, wherein the condenser elements comprise arrays of plates on both sides of a gas path.

3. The process as claimed m claim 1, wherein the condenser element plates are of stainless steel.

4. The process as claimed in claim 1, wherein the contactor comprises valves linking the jacket with an exhaust flue, the process including opening the valves to cause cooling by flow of down-draught from the flue and through the jacket, and closing the valves to cause heating.

5. The process as claimed in claim 1, wherein the contactor comprises valves linking the jacket with an exhaust flue, the process including opening the valves to cause cooling by flow of down-draught and closing the valve to cause heating; and wherein the valves provide access to a flue for exhaust gases of a combustion unit of the pyrolysis chamber.

6. The process as claimed in claim 1, wherein infeed to the pyrolysis chamber is controlled according to monitoring of a level of the molten material in the chamber, as detected by a gamma radiation detector arranged to emit gamma radiation through the chamber and to detect the radiation on an opposed side, intensity of received radiation indicating the density of contents of the chamber.

7. The process as claimed in claim 1, wherein the pyrolysis chamber is agitated by rotation of at least two helical blades arranged to rotate close to an internal surface of the pyrolysis chamber.

8. The process as claimed in claim 1, wherein the pyrolysis chamber is agitated by rotation of at least two helical blades arranged to rotate close to an internal surface of the pyrolysis chamber; and wherein the pyrolysis chamber is further agitated by a central auger.

9. The process as claimed in claim 1, wherein the pyrolysis chamber is agitated by rotation of at least two helical blades arranged to rotate close to an internal surface of the pyrolysis chamber; and wherein the pyrolysis chamber is further agitated by a central auger; and wherein the auger is located so that reverse operation of the auger causes output of char via a char outlet at the end of operation of the pyrolysis chamber.

10. The process as claimed in claim 1, wherein a bottom section of the distillation column is maintained at a temperature in the range of 200° C. to 240° C.

11. The process as claimed in claim 1, wherein a top section of the distillation column is maintained at a temperature in the range of 90° C. to 110° C.

12. The process as claimed in claim 1, wherein diesel is drawn from the distillation column and is further distilled to provide on-specification fuels.

13. The process as claimed in claim 1, wherein material is drawn from a top section of the distillation column to a knock-out pot which separates water, oil, and non-condensable gases, in turn feeding a gas scrubber to prepare synthetic gases for use in furnaces.

14. The process as claimed in claim 1, comprising further distillation of some material in a vacuum distillation column.

15. The process as claimed in claim 1, comprising further distillation of some material in a vacuum distillation column; and wherein heavy or waxy oil fractions are drawn from a bottom section of the vacuum distillation column.

16. The process as claimed in claim 1, comprising further distillation of some material in a vacuum distillation column; wherein heavy or waxy oil fractions are drawn from a bottom section of the vacuum distillation column; and wherein said heavy or waxy oil is recycled back to the pyrolysis chamber.

17. The process as claimed in claim 1, comprising further distillation of some material is in a vacuum distillation column; and wherein desired grade on-specification diesel is drawn from a middle section of the vacuum distillation column.

18. The process as claimed in claim 1, comprising further distillation of some material in a vacuum distillation column; and wherein light fractions are drawn from a top section of the vacuum distillation column and are condensed.

19. The process as claimed in claim 1, wherein a purging gas such as nitrogen is pumped through the pyrolysis chamber and the contactor and directly from the contactor to a thermal oxidizer where purging gas is burned.

20. The process as claimed in claim 1, wherein a purging gas such as nitrogen is pumped through the pyrolysis chamber and the contactor and directly from the contactor to a thermal oxidizer where purging gas is burned; and wherein any pyrolysis gases remaining at the end of a batch process are delivered from the contactor and are burned off together with the purging gas.

21. The process as claimed in claim 1, wherein load on a pyrolysis chamber agitator is monitored to provide an indication of when char drying is taking place.

22. The process as claimed in claim 1, wherein the pyrolysis chamber and the contactor are configured to be purged only via the purging conduit directly connected to a thermal oxidizer.

23. An apparatus for treating waste plastics material to provide at least one fuel product, the apparatus comprising:

(a) an extruder configured to receive a mixture of pelletized, flaked or granularized waste plastics material including a mixture of different waste plastics material, the mixture including at least two waste plastics from the group consisting of polythene, polythene variants, polystyrene and polypropylene, and for melting the waste plastics material including the mixture of pelletized, flaked or granularized waste plastics material including a mixture of waste plastics material, the mixture including at least two waste plastics from the group consisting of polythene, polythene variants, polystyrene and polypropylene, the mixture being a dynamically variable mixture of polythene, polythene variants, polystyrene and polypropylene, to produce the molten material, (b) a plurality of pyrolysis chamber and associated contactor pairs, each pair comprising:

(b(i)) a pyrolysis chamber for pyrolysing the molten material with agitation in an oxygen-free atmosphere to provide pyrolysis gases, the pyrolysis chamber configured to be isolated during purging via a purging conduit;

(b(ii)) a contactor configured to be isolated during purging via the purging conduit, the contactor having a bank of condenser elements inside the contactor so that some long chain gas components condense on said elements, said condenser elements comprising a plurality of plates forming an arduous path for pyrolysis gases, said plates being sloped downwardly for run-off of condensed long-chain hydrocarbon, and including apertures to allow upward progression of pyrolysis gases, and a contactor jacket surrounding at least a portion of the condenser elements with cooling fluid directed into the jacket, wherein the portion of said condenser elements are surrounded by the contactor jacket in a first direction when viewing the contactor and the contactor jacket in a side cross-sectional view thereof, and wherein the contactor jacket is provided outside an exterior surface of the contactor including the bank of condenser elements and the plates, and a controller to control temperature of the jacket to control level of condensation, (b(iii)) a pipe directly linking the pyrolysis chamber to the contactor in a second direction, the second direction perpendicular to the first direction, the pipe being arranged for conveying upwardly-moving pyrolysis gases into the contactor and for conveying downwardly-flowing long-chain liquid for thermal degradation from the contactor to said chamber, said pipe being linked only with said chamber and said contactor, said pipe being the only direct inlet into a vessel inside the contactor from the pyrolysis chamber, (b(iv)) a contactor outlet conduit configured to allow short chain gas components to exit from the contactor in gaseous form; and (c) a distillation manifold linked with the contactor outlet conduits of said pairs, (d) a distillation column separated from the contactor and being linked with the manifold for distilling said pyrolysis gases from the contactor to provide one or more fuel products, and (e) the purging conduit adapted to purge the pyrolysis chamber and the contactor of each pair in isolation from downstream components of the apparatus, and to pump a purging gas through the pyrolysis chamber and the contactor of each pair, and wherein, during the purging via the purging conduit, the pyrolysis chamber and the contactor are configured to be isolated from the extruder and any other of the downstream components of the system.

24. The apparatus as claimed in claim 23, comprising valves linking the jacket with an exhaust flue.

25. The apparatus as claimed in claim 23, comprising valves linking the jacket with an exhaust flue, and wherein the valves provide access to said flue for exhaust gases of a combustion unit of the pyrolysis chamber.

26. The apparatus as claimed in claim 23, wherein the pyrolysis chamber and the contactor are configured to be purged only via the purging conduit directly connected to a thermal oxidizer.

* * * * *